United States Patent [19]

Greig et al.

[11] Patent Number: 5,730,836
[45] Date of Patent: Mar. 24, 1998

[54] EVAPORATIVE CONCENTRATION OF CLAY SLURRIES

[75] Inventors: Christopher Roy Greig, Yeerongpilly; Peter James Tait, Moorooka; Peter John Noble, Alderley, all of Australia

[73] Assignee: Comalco Aluminium Limited, Melbourne, Australia

[21] Appl. No.: 256,134

[22] PCT Filed: Dec. 17, 1992

[86] PCT No.: PCT/AU92/00670

§ 371 Date: Sep. 26, 1994

§ 102(e) Date: Sep. 26, 1994

[87] PCT Pub. No.: WO93/12854

PCT Pub. Date: Jul. 8, 1993

[30] Foreign Application Priority Data

Dec. 31, 1991 [AU] Australia ............... PL0231

[51] Int. Cl.$^6$ .................. B01D 1/26; B01D 3/06
[52] U.S. Cl. ............... 159/2.3; 159/17.1; 159/23; 159/44; 159/47.1; 159/901; 159/DIG. 8; 159/DIG. 32; 202/174; 202/176; 202/235; 203/78; 203/88; 203/100; 203/DIG. 8
[58] Field of Search ............ 159/47.1, 44, 2.3, 159/17.1, 2.1, DIG. 8, DIG. 32, 46; 202/235, 174, 176; 203/DIG. 8, 2, 88, 78, 22, 80, 100; 501/150, 144

[56] References Cited

U.S. PATENT DOCUMENTS

| | | | |
|---|---|---|---|
| 2,735,787 | 2/1956 | Eastman et al. | 427/216 |
| 2,895,586 | 7/1959 | Di Luco | 197/172 |
| 2,920,832 | 1/1960 | Duke | 241/23 |
| 3,428,107 | 2/1969 | Backteman | 159/47 |
| 3,609,366 | 9/1971 | Schwartz . | |
| 3,884,767 | 5/1975 | Pottharst . | |
| 4,185,395 | 1/1980 | Nakako et al. | 34/12 |
| 4,246,039 | 1/1981 | Mixon, Jr. | 106/72 |
| 4,430,156 | 2/1984 | Casper et al. . | |
| 4,640,740 | 2/1987 | Moore et al. | 159/13.1 |
| 4,642,904 | 2/1987 | Smith, Jr. | 34/9 |
| 4,687,546 | 8/1987 | Willis | 159/2.1 |
| 5,036,599 | 8/1991 | Thompson | 34/5 |

FOREIGN PATENT DOCUMENTS 1065619  5/1967  United Kingdom .

OTHER PUBLICATIONS

William and Gardner, "Film Drum Dryers" Industrial Drying 1977.
Perry, "Chemical Engineers" Handbook 1941 pp. 1502–1504.
Howe, "Industrial and Engineering Chemistry", Rotary Steam–Tube Dryer (Bill), vol. 30, 1938 pp. 997–998.

*Primary Examiner*—Virginia Manoharan
*Attorney, Agent, or Firm*—Nikaido, Marmelstein, Murray & Oram, LLP

[57] ABSTRACT

A method for concentrating a clay slurry by subjecting the slurry to indirect heat exchange within a heat exchanger to elevate the temperature of the slurry while specifically suppressing boiling of the liquid within the heat exchanger. The heated slurry is subsequently subjected to a rapid pressure reduction which causes flash evaporation of part of the liquid. The rapid pressure reduction can occur in a separation vessel.

13 Claims, 3 Drawing Sheets

5,730,836

1

EVAPORATIVE CONCENTRATION OF CLAY SLURRIES

FIELD OF THE INVENTION

This invention relates to the evaporative concentration of clay slurries, and more particularly to an improved method and apparatus for concentrating beneficiated clay slurries by an evaporation process.

BACKGROUND OF THE INVENTION

Clay slurries, such as Kaolin, are beneficiated in an aqueous slurry having a low solids content. The most widely used method of dewatering such slurries after beneficiation involves initial processing in a vacuum or pressure filter to remove a first portion of the water from the slurry, typically to a level of about 50% to 70% solids. The resultant filter cake is then subjected to direct contact evaporation, usually by means of a spray dryer, to increase the solids content to about 95% to 99%.

As has already been recognised in the disclosure of U.S. Pat. No. 4,687,546 Willis, assigned to Georgia Kaolin Company Inc., the concentration of beneficiated clay slurries by spray drying is an inefficient method of evaporating the water from the slurry which requires the use of relatively clean hot gases to contact the slurry spray. This patent describes the use of non-contact or indirect evaporative heat exchangers to remove the water from the slurry. The specification of this patent claims that this method of processing the slurry avoids the problems of agglomeration which are prevalent with spray drying and results in a Kaolin product of improved brightness.

As a result of test work conducted by the present applicant to evaluate the concentration of Kaolin slurries by evaporation using standard techniques of free boiling and natural circulation, it is believed that the use of evaporative heat exchange techniques in the concentration of Kaolin slurries will result in the formation of a thick skin on the surface of the Kaolin slurry and a build up or accretion of high solids slurry on the heat exchange surfaces even at relatively low solids levels (40% to 45%). When this technique of free evaporation was tested in a long tube vertical evaporator, it was quickly found that plugging of the tubes rapidly occurred and concentration could not effectively be achieved as a continuous process even when low solids slurries were processed at high specific circulation rates.

SUMMARY OF INVENTION AND OBJECT

It is an object of the first aspect of the present invention to provide an improved method and apparatus for the concentration of clay slurries in which the problems associated with the use of indirect evaporative heat exchange are substantially overcome or ameliorated.

In a first aspect, the invention provides a method for the concentration of clay slurries comprising the steps of subjecting the slurry to indirect heat exchange in a heat exchanger to elevate the temperature of the liquid in the slurry while specifically suppressing boiling of the liquid within the heat exchanger, and subjecting the heated slurry to rapid pressure reduction to flash-evaporate part of the liquid from the slurry.

By suppressing boiling in the heat exchanger, the build up of high solids slurry at the heat exchange surfaces is significantly reduced thereby allowing continuous processing on a more efficient basis. The use of indirect heat exchange to heat the slurry allows the use of waste heat which is often available at processing plants, although not generally suitable for use in spray drying techniques. Thus, the combination of indirect heat exchange with the suppression of boiling to avoid fouling of the heat exchanger provides a particularly efficient and relatively inexpensive method of concentrating the clay slurry.

The rapid pressure reduction of the heated slurry is preferably achieved at the entrance to a separator vessel positioned downstream of the heat exchanger. The necessary concentration of a clay slurry, such as Kaolin, to the necessary solid level (for example, from about 34% solids to about 69% solids) is most suitably achieved by the use of multiple-effect evaporation, with each effect including an indirect heat exchanger, such as a plate heat exchanger, and a separator connected in series with similar effects. In such an arrangement, the vapor from each separator is directed to the following effect to achieve more evaporation at a correspondingly lower temperature and pressure. The temperatures and pressures in each effect are progressively lower until the practical limits of vacuum in the separator have been reached.

In another aspect, the invention provides an apparatus for concentrating a clay slurry comprising an indirect heat exchanger adapted to elevate the temperature of the liquid in the slurry, means for specifically suppressing boiling of the liquid in the heat exchanger, and means connected to the heat exchanger for rapidly reducing the pressure of the heated slurry to cause evaporation of part of the water from the slurry.

In a preferred embodiment, a multiplicity of heat exchangers and pressure reduction means are connected in series to provide a multiple-effect evaporation system, and means for passing the vapor from the pressure reduction means of the first to last but-one effects in the system to the heat exchanger of the subsequent effect to provide heat exchange medium for that heat exchanger.

In considering the design of a multiple effect heat exchange and evaporation system, authoritative texts indicated that a backward fed system with a low solids feed entering the low temperature last effect, and being progressively heated on its way to the high temperature, high solids first effect, would give the best economy in the balance of fuel and power costs against capital expenditure. In this regard, the disclosure contained in the U.S. Pat. No. 4,687, 546 referred to above describes a backward fed system as its preferred system. Thus, in the initial design work associated with the present invention a backward fed system was considered. However, it was subsequently determined that a modified form of forward fed system provided the best balance of operating costs against capital expenditure, bearing in mind the greater simplicity of a forward fed system.

In this aspect of the invention, there is provided a multiple effect system for the concentration of clay slurries, comprising a multiplicity of evaporative effects connected in series, with each effect comprising indirect heat exchange means for heating the slurry and means for causing evaporation of part of the water from the slurry, means for forward feeding the clay slurry from the first effect to the last effect, supplementary heat exchange means for preheating the slurry prior to reaching the first effect, said supplementary heat exchangers receiving heat exchange fluid from each of the heat exchangers in the second to last effects.

In a preferred form of the above system, each effect comprises an indirect heat exchanger with means to suppress boiling of the water contained in the slurry, and means to rapidly reduce the pressure of the heated slurry to cause evaporation of part of the water from the slurry. In a preferred aspect of the invention, valve means are positioned between a heat exchange zone and a separator, and the solids content of the slurry entering the valve means is the same as the solids content of the slurry entering the heat exchange zone.

BRIEF DESCRIPTION OF THE DRAWINGS

In order that the invention may be more readily understood, one presently preferred embodiment of the invention will now be described with reference to the accompanying drawings in which.

DESCRIPTION OF PREFERRED EMBODIMENT

Figure 1:
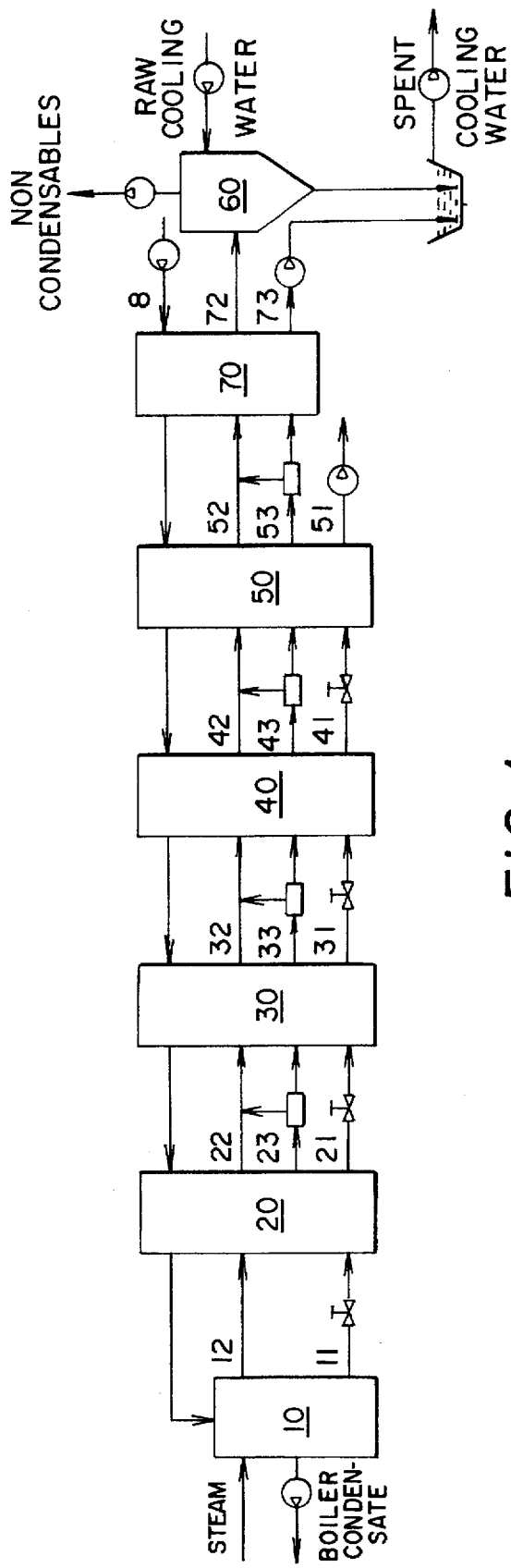
FIG. 1 is a schematic diagram of a five effect forward fed evaporator with vapor-heated feed.

Referring to FIG. 1, the presently preferred embodiment of the present invention comprises a forward-feed, multiple effect evaporation having five effects 10, 20, 30, 40, 50. Each effect is arranged to heat incoming slurry by indirect heat exchange, while specifically suppressing boiling in the heat exchanger. Each effect also includes means to reduce the pressure of the heated slurry to cause evaporation of at least part of the liquid from the slurry.

The heated slurry 11 from effect 10 passes to effect 20. Process vapor 12 from effect 10, which comprises vapor formed by evaporation of part of the liquid from the slurry, is also passed to effect 20. Process vapor 12 acts as the heating medium for effect 20. As shown in FIG. 1, the heated slurry and process vapor from effects 20, 30 and 40 are also passed to the subsequent downstream 15 effects. Slurry 51 is the product slurry of the desired solids content.

Effects 20, 30, 40, 50 also include a heat exchange section to pre-heat the feed slurry 8.

In the embodiment shown in FIG. 1, effect 10 is operated at 110° C., effect 20 at 99° C., effect 30 at 88° C., effect 40 at 77° C. and effect 50 at 60° C. Feed slurry at 30° C. is supplied to feed heater 70 and thereafter through the pre-heating sections of effects 50, 40, 30 and 20.

As shown in FIG. 1, process condensate 13, 23, 33, 43 is also used as a heat exchange medium in the respective subsequent downstream effects.

Figure 2A:
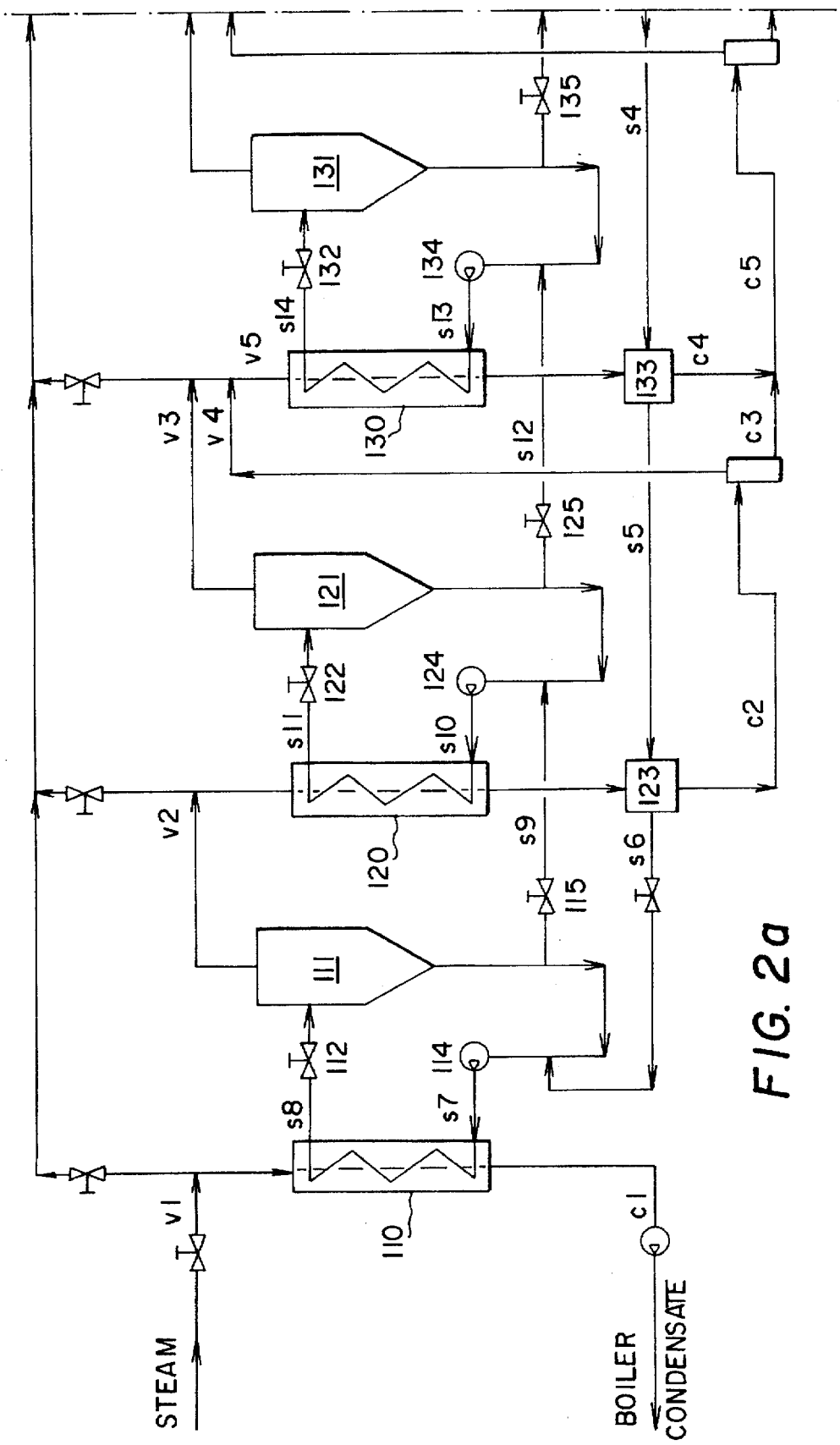
FIGS. 2a and 2b are more detailed schematic diagrams of the evaporator shown in FIG. 1 of the drawings. Table 1 shows a set of process flow details for the production of about 150,000 tons of product per annum using the evaporator shown in FIG. 2.
Figure 2B:
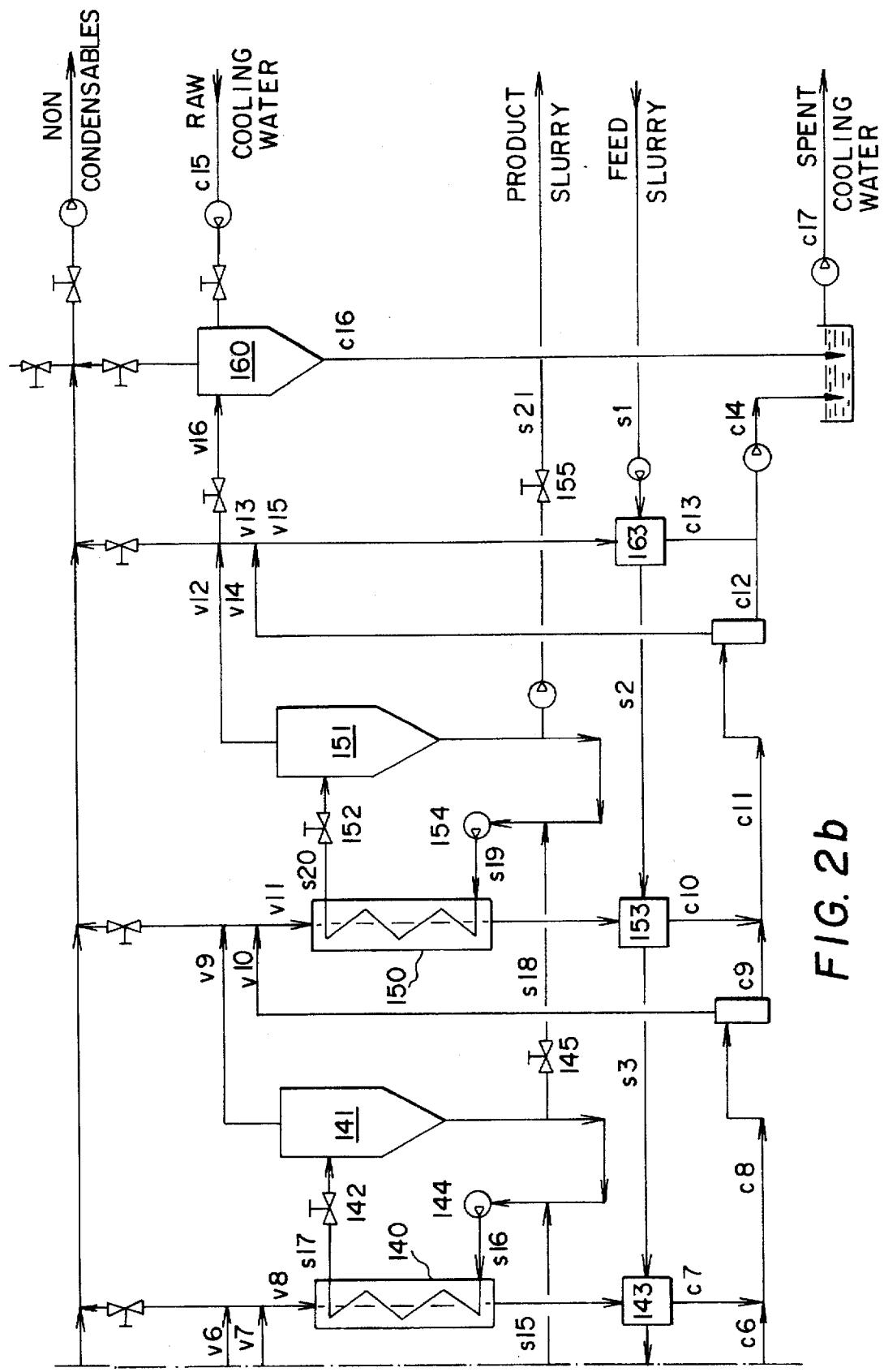

Referring to FIGS. 2a and 2b of the drawings, the presently preferred embodiments comprises a forward fed evaporator having five separate effects connected in series, with each effect including an indirect heat exchanger 110, 120, 130, 140 and 150, in the present embodiment a plate heat exchanger and a separator 111, 121, 131, 141 and 151, and control valve means 112, 122, 132, 142 and 152 for controlling the pressure of the slurry in the asso-cheat exchanger 110 to 150 to specifically suppress boiling of the feed slurry within each heat exchanger 110 to 150. Following the fifth effect, a direct condenser 160 is provided to condense the final vapor.

The heat exchanger 110 of the first effect is fed with steam from a boiler (not shown) while the vapor from each separator 111 to 141 is fed to the downstream heat exchanger 120 to 150 to provide heat exchange medium for those effects.

The feed slurry is fed to the heat exchanger 110 of the first effect via supplementary heat exchangers 163, 153, 143, 133 and 123, with the first supplementary heat exchanger 163 receiving heating vapor from the separator of the last effect, while the supplementary heat exchangers 153, 143, 133 and 123 receive heating vapor from the principal heat exchangers 150, 140, 130 and 120, respectively. These supplementary heat exchangers preheat the feed slurry before it reaches the heat exchanger 110 of the first effect, which is at the highest temperature, as indicated in the process flow data in Table 1, and the feed slurry is at a suitable temperature for heating to the desired temperature in the heat exchanger 110. This arrangement enables a forward fed arrangement to be efficiently utilised to benefit from the lower capital cost of such a system.

The supplementary heat exchangers 123 to 153 may be provided by constructing the heat exchangers 120 to 150 as double units, with heat exchange from vapor to recirculating slurry occurring on one side of a divider plate, and feed slurry heating occurring on the other side of the divider plate, from a common vapor supply and condensate drain.

Slurry is recirculated in each effect by means of a slurry pump 114, 124, 134, 144 and 154 connected between the outlet from each separator 111 to 151 to the slurry inlet of each heat exchanger 110 to 150, while valves 115 to 155 control the feed rate of the heated slurry from one effect to the next or to the next process.

As mentioned previously, the forward-fed arrangement described above was selected in favour of the backward fed arrangement indicated by authoritative texts to be preferred. Analysis of small-scale test work suggested that the optimum values of specific mass flow rate (SMFR) would be in the range 0.9 to 1.0 kg/sm$^2$. However, early pilot test work demonstrated that the heat exchangers of some effects would tend to bog at such low rates. Practical lower limits of SMFR were defined and adoption of these minimum values, and vapor preheating of the feed slurry, changed the economic balance of the corresponding full scale evaporator.

The invention described herein is suitable for concentrating clay slurries, especially Kaolin clay slurries, from an initial solids content at 30–45% to a final solids content of from 65–75%, by weight, more preferably 68–73% by weight.

The claims form part of the invention as described in the present specification.

TABLE 1

| Process Conditions for the Flowsheet Shown in FIG. 2 | | | | | | | | | | | | | | |
|---|---|---|---|---|---|---|---|---|---|---|---|---|---|---|
| ITEM\VAPOUR | V1 | V2 | V3 | V4 | V5 | V6 | V7 | V8 | V9 | V10 | V11 | V12 | V13 | V14 |
| VAPOUR lph | 5.60 | 5.12 | 4.91 | 0.10 | 5.02 | 4.72 | 0.20 | 4.92 | 4.54 | 0.29 | 4.83 | 4.13 | 1.01 | 0.58 |
| TEMPERATURE °C. | 125 | 110 | 99 | 99 | 99 | 88 | 88 | 88 | 77 | 77 | 77 | 60 | 60 | 60 |
| PRESSURE kPpg | 131 | 42 | −3 | −3 | −3 | −36 | −36 | −36 | −59 | −59 | −59 | −81 | −81 | −81 |

TABLE 1-continued

Process Conditions for the Flowsheet Shown in FIG. 2

| ITEM\SLURRY | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| TOTAL lph | 50.14 | 50.14 | 50.14 | 50.14 | 50.14 | 50.14 | 508 | 508 | 45.03 | 594 | 594 | 40.11 | 812 | 812 |
| PERCENT SOLIDS % K | 36.76 | 36.76 | 36.76 | 36.76 | 36.76 | 36.76 | 40.5 | 40.5 | 40.9 | 45.8 | 45.8 | 45.9 | 51.7 | 51.7 |
| TEMPERATURE °N. | 30 | 55 | 72 | 83 | 94 | 105 | 110.0 | 118.4 | 110 | 100.3 | 106.4 | 99 | 89.2 | 85.5 |

| ITEM\CONDENSATE | C1 | C2 | C3 | C4 | C5 | C6 | C7 | C8 | C9 | C10 | C11 | C12 | C13 | C14 |
|---|---|---|---|---|---|---|---|---|---|---|---|---|---|---|
| CONDENSATE lph | 5.60 | 5.12 | 5.01 | 5.02 | 10.03 | 8.83 | 4.92 | 14.75 | 14.48 | 4.83 | 19.29 | 18.71 | 1.59 | 20.30 |
| TEMPERATURE °C. | 125 | 110 | 99 | 99 | 99 | 88 | 88 | 88 | 77 | 77 | 77 | 60 | 60 | 60 |
| PRESSURE kPpg | 131 | 42 |  | −3 |  |  | −34 |  |  | −59 |  |  | −81 |  |

| ITEM\VAPOUR | V15 | V16 |
|---|---|---|
| VAPOUR lph | 1.59 | 3.12 |
| TEMPERATURE °C. | 60 | 60 |
| PRESSURE kPpg | −81 | −81 |

| ITEM\SLURRY | S15 | S16 | S17 | S18 | S19 | S20 | S21 |
|---|---|---|---|---|---|---|---|
| TOTAL lph | 35.39 | 666 | 666 | 30.88 | 623 | 623 | 28.71 |
| PERCENT SOLIDS % K | 52.1 | 58.3 | 50.3 | 50.7 | 68.5 | 68.5 | 69.0 |
| TEMPERATURE °N. | 88 | 78.1 | 84.5 | 77 | 81.4 | 88.8 | 80 |

| ITEM\CONDENSATE | C15 | C16 | C17 |
|---|---|---|---|
| CONDENSATE lph | 118 | 121 | 141 |
| TEMPERATURE °C. | 40 | 55 | 56 |
| PRESSURE kPpg |  |  |  |

We claim:

1. A method for the concentration of clay slurries comprising:

feeding a feed slurry, comprising clay and a liquid, to a heat exchanger;

subjecting the slurry to indirect heat exchange in said heat exchanger to elevate the temperature of the slurry;

passing the slurry from said heat exchanger through a valve means to a separating zone, said valve means being disposed between said heat exchanger and said separating zone, said valve means controlling the pressure in said heat exchanger to suppress boiling of said liquid within said heat exchanger, said separating zone having a pressure which is lower than said pressure in said heat exchanger, said pressure in said separating zone being sufficiently low to flash evaporate at least part of the liquid from the slurry in said separating zone, the solids content of the slurry entering said valve means being the same as the solids content of the slurry entering said heat exchanger.

2. A method for the concentration of a clay slurry, comprising feeding a clay slurry, comprising clay and a liquid, to a first heat exchanger of a first heat exchange effect of an evaporation system, said evaporation system comprising a plurality of heat exchange effects including at least said first heat exchange effect and a second heat exchange effect, said first heat exchange effect comprising said first heat exchanger, a first separating zone and a first valve means positioned between said first heat exchanger and said first separating zone, said second heat exchange effect comprising a second heat exchanger, a second separating zone and a second valve means positioned between said second heat exchanger and said second separating zone;

subjecting the slurry to indirect heat exchange with a heating medium in said first heat exchanger to elevate the temperature of the slurry;

passing the slurry through said first valve means to said first separating zone, said first valve means controlling the pressure in said first heat exchanger to suppress boiling of said liquid within said first heat exchanger, said first separating zone having a pressure which is lower than said pressure in said first heat exchanger, said pressure in said first separating zone being sufficiently low to flash evaporate at least part of the liquid from the slurry in said first separating zone, the solids content of the slurry entering said first valve means being the same as the solids content of the slurry entering said first heat exchanger;

removing the slurry from said first separating zone and feeding the slurry removed from said first separating zone to said second heat exchanger;

subjecting the slurry to indirect heat exchange in said second heat exchanger to elevate the temperature of the slurry;

passing the slurry from said second heat exchanger through said second valve means to said second separating zone, said second valve means controlling the pressure in said second heat exchanger to suppress boiling of said liquid within said second heat exchanger, said second separating zone having a pressure which is lower than the pressure in said second heat exchanger, said pressure in said second separating zone being sufficiently low to flash evaporate at least part of the liquid from the slurry in said second separating zone, the solids content of the slurry entering said second valve means being the same as the solids content of the slurry entering said second heat exchanger; and removing vapor from said first separating zone and feeding said vapor to said second heat exchanger, said vapor forming a heating medium for said indirect heat exchange with the slurry in said second heat exchanger.

3. A method as claimed in claim 2 wherein the operating pressure of the plurality of heat exchange effects is progressively lower in a downstream direction.

4. A method as claimed in claim 2 further comprising preheating slurry, supplied to said first heat exchanger, by indirect heat exchange contacting of such slurry with the heating medium from at least one downstream heat exchange effect.

5. A method as claimed in claim 2 wherein a heating medium used in said first heat exchanger comprises steam generated in a boiler.

6. A method as claimed in claim 2 including concentrating clay slurry from a feed solids content of 30 to 45% solids content to a product content of 65 to 75% solids by weight.

7. A method for the concentration of a clay slurry, comprising:

feeding a feed slurry, comprising clay and a liquid, the slurry having a concentration of from 30 to 45% by weight solids, to a heat exchanger;

subjecting the slurry to indirect heat exchange in said heat exchanger to elevate the temperature of the slurry;

passing the slurry from said heat exchanger through a valve means to a separating zone, said valve means controlling the pressure in said heat exchanger to suppress boiling of said liquid within said heat exchanger, said separating zone having a pressure which is lower than said pressure in said heat exchanger, said pressure in said separating zone being sufficiently low to flash evaporate at least part of the liquid from the slurry in said separating zone, the solids content of the slurry entering said valve means being the same as the solids content of the slurry entering said heat exchanger;

removing slurry from said separating zone and recirculating at least part of the removed slurry to said heat exchanger;

thereby concentrating the slurry from an initial concentration of from 30 to to 45% by weight solids to a final concentration of from 65 to 75% by weight solids.

8. A method as claimed in claim 7, wherein the clay slurry has an initial solids concentration of 30 to 45% by weight.

9. A method for the concentration of a clay slurry, comprising feeding a clay slurry, comprising clay and a liquid, the slurry having a concentration of from 30 to 45% by weight solids, to a first heat exchanger of a first heat exchange effect of an evaporation system, said evaporation system comprising a plurality of heat exchange effects including at least said first heat exchange effect and a second heat exchange effect, said first heat exchange effect comprising said first heat exchanger, a first separating zone and a first valve means positioned between said first heat exchanger and said first separating zone, said second heat exchange effect comprising a second heat exchanger, a second separating zone and a second valve means positioned between said second heat exchanger and said second separating zone;

subjecting the slurry to indirect heat exchange with a heating medium in said first heat exchanger to elevate the temperature of the slurry;

passing the slurry through said first valve means to said first separating zone, said first valve means controlling the pressure in said first heat exchanger to suppress boiling of said liquid within said first heat exchanger, said first separating zone having a pressure which is lower than said pressure in said first heat exchanger, said pressure in said first separating zone being sufficiently low to flash evaporate at least part of the liquid from the slurry in said first separating zone, the solids content of the slurry entering said first valve means being the same as the solids content of the slurry entering said first heat exchanger;

removing the slurry from said first separating zone and feeding a first part of the slurry removed from said first separating zone to said second heat exchanger and feeding a second part of the slurry removed from said first separating zone to said first heat exchanger;

subjecting the slurry to indirect heat exchange in said second heat exchanger to elevate the temperature of the slurry;

passing the slurry from said second heat exchanger through said second valve means to said second separating zone, said second valve means controlling the pressure in said second heat exchanger to suppress boiling of said liquid within said second heat exchanger, said second separating zone having a pressure which is lower than the pressure in said second heat exchanger, said pressure in said second separating zone being sufficiently low to flash evaporate at least part of the liquid from the slurry in said second separating zone, the solids content of the slurry entering said second valve means being the same as the solids content of the slurry entering said second heat exchanger; and removing vapor from said first separating zone and feeding said vapor to said second heat exchanger, said vapor forming a heating medium for said indirect heat exchange with the slurry in said second heat exchanger;

thereby concentrating the slurry from an initial concentration of from 30 to to 45% by weight solids to a final concentration of from 65 to 75% by weight solids.

10. A method as claimed in claim 9, wherein subsequent downstream heat exchange effects have a lower pressure than corresponding upstream heat exchange effects.

11. A method as claimed in claim 9, further comprising preheating slurry supplied to said first heat exchanger, by indirect heat exchange with the heating medium from at least one downstream heat exchange effect.

12. A method as claimed in claim 9, wherein a heating medium used for said indirect heat exchange in said first heat exchanger comprises steam generated in a boiler.

13. A method as claimed in claim 9, wherein the clay slurry has an initial solids concentration of 30 to 45% by weight.

\* \* \* \* \*